United States Patent
Shimizu et al.

(10) Patent No.: US 11,094,472 B2
(45) Date of Patent: Aug. 17, 2021

(54) METHOD FOR PRODUCING ELECTRODE FOR ALUMINUM ELECTROLYTIC CAPACITOR

(71) Applicant: NIPPON LIGHT METAL COMPANY, LTD., Tokyo (JP)

(72) Inventors: Yuta Shimizu, Shizuoka (JP); Masahiko Katano, Shizuoka (JP); Yuya Yoshida, Shizuoka (JP); Toshifumi Taira, Osaka (JP); Shinya Sone, Osaka (JP)

(73) Assignee: NIPPON LIGHT METAL COMPANY, LTD., Tokyo (JP)

( * ) Notice: Subject to any disclaimer, the term of this patent is extended or adjusted under 35 U.S.C. 154(b) by 0 days.

(21) Appl. No.: 16/461,792

(22) PCT Filed: Oct. 3, 2017

(86) PCT No.: PCT/JP2017/035950
§ 371 (c)(1),
(2) Date: May 16, 2019

(87) PCT Pub. No.: WO2018/092445
PCT Pub. Date: May 24, 2018

(65) Prior Publication Data
US 2019/0362901 A1   Nov. 28, 2019

(30) Foreign Application Priority Data
Nov. 18, 2016 (JP) .............................. JP2016-225003

(51) Int. Cl.
*C23C 28/00* (2006.01)
*C23C 28/04* (2006.01)
(Continued)

(52) U.S. Cl.
CPC ............ *H01G 9/045* (2013.01); *B05D 3/0254* (2013.01); *H01G 9/0029* (2013.01); *H01G 9/0525* (2013.01); *H01G 9/15* (2013.01)

(58) Field of Classification Search
CPC .................................. C23C 28/00; C23C 28/04
(Continued)

(56) References Cited

U.S. PATENT DOCUMENTS 4,113,579 A    9/1978  Randall, Jr. et al.
4,437,946 A *  3/1984  Bernard ................. C25D 11/12
                                                    205/175

(Continued)

FOREIGN PATENT DOCUMENTS

CN    104620342 A    5/2015
EP    0616343 A2    9/1994
(Continued)

OTHER PUBLICATIONS

Chi et al., "Transition of Hydrated Oxide Layer for Aluminum Electrolytic Capacitors," Materials Science and Engineering: A (Mar. 25, 2007), vols. 449-451, pp. 314-317. (Year: 2007).*
(Continued)

*Primary Examiner* — Edna Wong

(57) ABSTRACT

Provided is a method for producing an electrode for an electrolytic capacitor, the method comprising: a hydration step in which an aluminum electrode is immersed in a hydration treatment solution having a temperature of 80° C. or higher; and a chemical conversion step in which the aluminum electrode is subjected to chemical conversion treatment up to a formation voltage of at least 400 V. The hydration treatment solution contains a hydration inhibitor. The thickness of a hydrated film formed in the hydration step satisfies the following condition, $0.6 \leq t2/t1 \leq 1$, wherein t1 is the average thickness of the hydrated film formed in a depth
(Continued)

range of up to 100 μm from the surface of the aluminum electrode, and t2 is the average thickness s of the hydrated film formed in a deep portion at least 100 μm from the surface of the aluminum electrode.

5 Claims, 11 Drawing Sheets

(51) Int. Cl.
*H01G 9/045* (2006.01)
*B05D 3/02* (2006.01)
*H01G 9/00* (2006.01)
*H01G 9/052* (2006.01)
*H01G 9/15* (2006.01)

(58) Field of Classification Search
USPC .......................................................... 205/188
See application file for complete search history.

(56) References Cited

U.S. PATENT DOCUMENTS

| | | | |
|---|---|---|---|
| 7,175,676 | B1 | 2/2007 | Stevens et al. |
| 2003/0030970 | A1* | 2/2003 | Persico ................ H01G 9/0036 361/525 |
| 2010/0326837 | A1 | 12/2010 | Kurihara et al. |
| 2011/0242734 | A1 | 10/2011 | Dominey |
| 2012/0231262 | A1* | 9/2012 | Sone .................... H01G 9/0525 428/328 |
| 2015/0221443 | A1* | 8/2015 | Katano ................ H01G 9/0029 427/80 |

FOREIGN PATENT DOCUMENTS

| | | | | |
|---|---|---|---|---|
| EP | 2897143 | A1 | 7/2015 | |
| JP | S57-6250 | B2 | 2/1982 | |
| JP | 02216811 | A * | 8/1990 | ............... H01G 9/04 |
| JP | H02-216811 | A | 8/1990 | |
| JP | H05-66005 | B2 | 9/1993 | |
| JP | 2004-253755 | A | 9/2004 | |
| JP | 2014-57000 | A | 3/2014 | |
| JP | 5490446 | B2 | 5/2014 | |
| WO | WO-2014041898 | A1 * | 3/2014 | ............... B05D 1/18 |

OTHER PUBLICATIONS

WIPO, International Search Report for for PCT Application No. PCT/JP2017/035950, dated May 12, 2017.
WIPO, Written Opinion for for PCT Application No. PCT/JP2017/035950, dated May 12, 2017.
Isao Nagata et al., "Aluminium electrolytic capacitor with liquid electrolyte cathode, enlarged and revised edition", 2nd edition, Japan Capacitor Industrial Co., Ltd., Feb. 24, 1997, p. 4-5, 266-272 (Cited in International Search Report and Written Opinion for PCT/JP2017/035950).
EPO, Extended European Search Report for European Patent Application No. 17871932.4, dated Mar. 31, 2020.
The State Intellectual Property Office of People's Republic of China, Office action for Chinese Patent Application No. 201780071608.5, dated Sep. 20, 2020.

* cited by examiner

100 μm

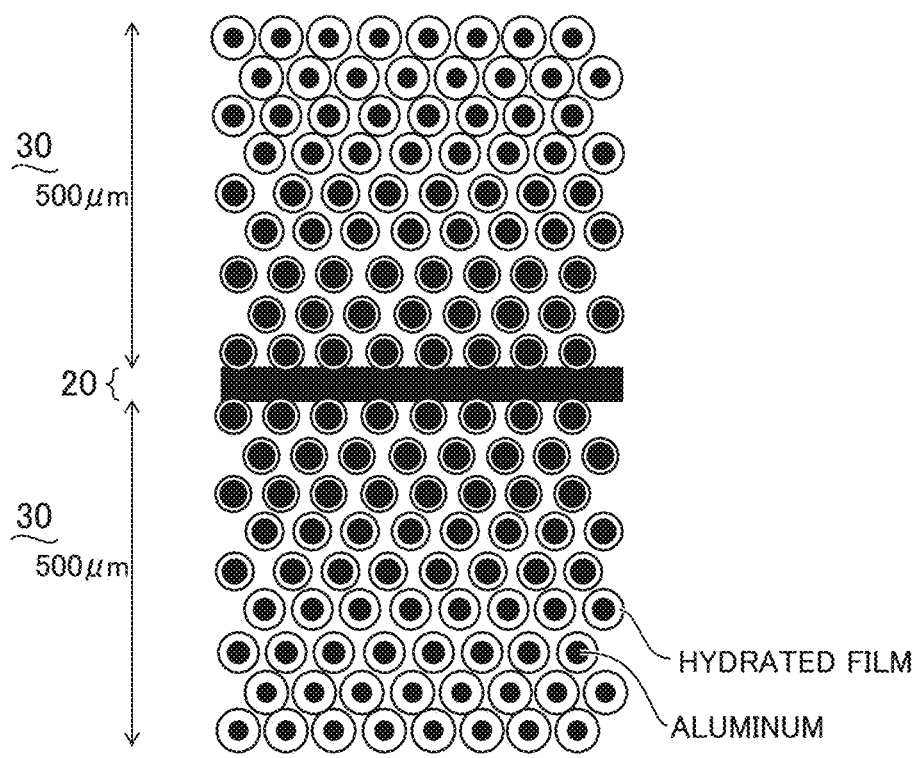

US 11,094,472 B2

METHOD FOR PRODUCING ELECTRODE FOR ALUMINUM ELECTROLYTIC CAPACITOR

FIELD

The present invention relates to a method for producing an electrode for an aluminum electrolytic capacitor that performs chemical formation of an aluminum electrode.

BACKGROUND

In a method for producing an electrode for an aluminum electrolytic capacitor used as an anode for a medium and high voltage aluminum electrolytic capacitor, it has been known that the process of pure water boiling for the aluminum electrode is carried out before chemical formation treatment is carried out. By carrying out the pure water boiling, electric power consumption required for the chemical formation can be reduced and higher electrostatic capacitance after the chemical formation can be provided.

However, aluminum has high reactivity with water and thus the hydration reaction of the aluminum electrode with water during the pure water boiling is strong. Consequently, a hydrated film generated by the pure water boiling is porous and has many defects. Therefore, the defects remain in the chemical formation film generated in the subsequent chemical formation step. Such defects can be removed by depolarization treatment when the chemical formation voltage is less than 400 V. However, when the chemical formation is carried out at a voltage of 400 V or more, the thickness of the chemical formation film is thick and thus the defects cannot be sufficiently removed by the depolarization treatment in many cases. Consequently, the electrode for the aluminum electrolytic capacitor formed at a chemical formation voltage of 400 V or more tends to increase leakage current.

In addition, the hydration reaction of the aluminum electrode with water during the pure water boiling is strong and thus bubbles are intensely generated during the pure water boiling. Therefore, when an etched foil in which tunnel-like pits are formed is used for the aluminum electrode for medium and high voltage, the pits in the surface tend to be clogged by a hydrated product generated during the strong hydration reaction. In addition, the hydration reaction is less likely to be progressed in the deep part of the pit caused by the clogging and the generated bubbles. In addition, when a porous aluminum electrode in which the porous layer made of the sintered layer of aluminum powder is formed on the surface of an aluminum core material is used as the aluminum electrode, strong hydration reaction is progressed at the surface of the aluminum electrode and the clogging occurs in the vicinity of surface by thus generated hydrated product. In addition, the hydration reaction is difficult to be progressed in the deep part of the porous layer due to the clogging and the generated bubbles. This may cause improper formation of the hydrated film. When such a phenomenon occurs, the gas generated inside the porous layer is difficult to be discharged at the time of the subsequent chemical formation to break the porous layer. This increases the leakage current of the electrode for the aluminum electrolytic capacitor.

On the other hand, a method for producing an aluminum electrode for an electrolytic capacitor including attaching an organic acid to the surface of a hydrated film after a pure water boiling step is developed (Patent Literature 1).

CITATION LIST

Patent Literature

Patent Literature 1: Japanese Patent No. 5490446

SUMMARY

Technical Problem

However, the technique described in Patent Literature 1 is a technique for reducing dissolution of the hydrated film by an organic acid at the time of using a phosphoric acid-based chemical formation liquid in the chemical formation step. This technique cannot reduce defects in the hydrated film generated in the pure water boiling step. Therefore, the leakage current is difficult to decrease even if steps are added.

In consideration of the above problems, an object of the present invention is to provide a method for producing an electrode for an aluminum electrolytic capacitor that can reduce the leakage current.

Solution to Problem

In order to solve the above problems, a method for producing an anode foil for the aluminum electrolytic capacitor according to the present invention comprises:

a hydration step of forming a hydrated film onto an aluminum electrode including a porous layer having a thickness of 200 μm to 50000 μm per layer on an aluminum core part by immersing the aluminum electrode into a hydration treatment liquid including a hydration inhibiting agent and having a temperature of 80° C. or more; and a chemical formation step of performing chemical formation of the aluminum electrode to a chemical formation voltage of 400 V or more after the hydration step, wherein the thickness of the hydrated film formed in the hydration step satisfies the following conditions:

$$0.6 \leq t2/t1 \leq 1$$

where an average thickness of the hydrated film formed in a range from the surface of the aluminum electrode to a depth of 100 μm is t1 and an average thickness of the hydrated film formed in a deep part having a depth of 100 or more from the surface of the aluminum electrode is t2.

In the present invention, the hydration treatment liquid used in the hydration step includes hydration inhibiting agent and thus, different from the pure water boiling in which the aluminum electrode is immersed into boiling pure water, the progressing rate of the hydration reaction can be adequately reduced. Therefore, the clogging at the aluminum electrode surface due to an excessive hydrated film is less likely to occur. In addition, the generation rate of bubbles due to the hydration reaction is low and thus a state where the hydration reaction is difficult to be progressed in the deep part of the porous layer is less likely to occur. Therefore, a constitution in which the thickness of the hydrated film satisfies the following conditions:

$$0.6 \leq t2/t1 \leq 1$$

where an average thickness of the hydrated film formed in a range from the surface of the aluminum electrode to a depth of 100 μm is t1 and an average thickness of the hydrated film formed in a deep part of the aluminum electrode (a prat having a depth of 100 µm or more) is t2. Therefore, the clogging at the surface due to the excessive hydrated film can be reduced. Consequently, the break of the porous layer caused by not discharging the gas generated at the time of the subsequent chemical formation can be prevented and thus the leakage current of the electrode for the aluminum electrolytic capacitor can be reduced. In addition, in the present invention, there is an advantage that, different from the case where new treatment is added, significant change in production processes and production facilities is not necessary because the above conditions are achieved by changing conditions in the hydration step (the composition of the hydration treatment liquid or the like).

In the present invention, an embodiment is provided in which the hydration treatment liquid has a pH of 5.0 to 9.0.

In the present invention, inorganic hydration inhibiting agents including boric acid or the salts thereof and inorganic hydration inhibiting agents may be used in the hydration step. The organic hydration inhibiting agent has higher hydration inhibition effect than that of the inorganic hydration inhibiting agent. Therefore, in the present invention, the hydration inhibiting agent is preferably an organic hydration inhibiting agent having a carbon number of 3 or more.

In the present invention, an embodiment is provided in which the hydration inhibiting agent is a sugar having a carbon number of 3 or more or a sugar alcohol having a carbon number of 3 or more. In this case, for example, any one or more of ribulose, xylulose, ribose, arabinose, xylose, lyxose, deoxyribose, psicose, fructose, sorbose, tagatose, allose, altrose, glucose, mannose, gulose, idose, galactose, talose, fucose, fuculose, rhamnose, sedoheptulose, mannitol, sorbitol, xylitol, sucrose, lactulose, lactose, maltose, trehalose, cellobiose, lactitol, maltitol, nigerose, raffinose, maltotriose, melezitose, stachyose, acarbose, and amylose can be selected as the hydration inhibiting agent.

In the present invention, an embodiment is provided in which the hydration inhibiting agent is an organic acid having a carbon member of 3 or more or a salt thereof. In this case, for example, any one or more of dodecanoic acid, benzoic acid, propanedioic acid, butanedioic acid, (E)-2-butenedioic acid, pentanedioic acid, hexanedioic acid, decanedioic acid, dodecanedioic acid, 2-hydroxypropane-1,2,3-tricarboxylic acid, and (E)-1-propene-1,2,3-tricarboxylic acid can be selected as the organic acid.

In the present invention, an embodiment is provided in which the aluminum electrode is formed by laminating the porous layers made of sintered layers of aluminum powder and having a thickness of 200 µm to 50000 µm per layer onto the aluminum core material as the core part. According to such an embodiment, even when the chemical formation voltage is 400 V or more, the aluminum electrode can obtain high electrostatic capacitance compared with the case where an etched foil is used as an aluminum electrode. The surface of the porous layer has high reactivity with boiling pure water compared with the surface of the etched foil and thus the clogging at the surface tends to occur and defects in the hydrated film tend to generate. In the present invention, however, the progressing rate of the hydration reaction in the hydration step can be adequately reduced. Therefore, the clogging at the surface is difficult to occur and defects are difficult to be generated. In addition, the generation rate of the bubbles due to the hydration reaction is low and thus a state where the hydration reaction in the deep part of the porous layer is less likely to progress due to the generated bubbles is difficult to occur. Consequently, the break of the porous layer caused by not discharging the gas generated at the time of the subsequent chemical formation can be prevented. In addition, the defects in the chemical formation film can be reduced and thus the leakage current of the electrode for the aluminum electrolytic capacitor can be reduced.

In the present invention, an embodiment is provided in which the chemical formation step includes first chemical formation treatment for subjecting the aluminum electrode to chemical formation in an aqueous solution including an organic acid or a salt thereof and second chemical formation treatment for subjecting the aluminum electrode to chemical formation in an aqueous solution including an inorganic acid or a salt thereof after the first chemical formation treatment. According to such an embodiment, the aluminum electrode is subjected to the organic acid chemical formation in the first chemical formation treatment and thus the electrostatic capacitance can be improved. Even in this case, the aluminum electrode is subjected to the inorganic acid chemical formation in the second chemical formation treatment and thus the leakage current of the electrode for the aluminum electrolytic capacitor can be reduced.

Advantageous Effects of Invention

In the present invention, the hydration treatment liquid used in the hydration step includes hydration inhibiting agent and thus, different from the pure water boiling in which the aluminum electrode is immersed into boiling pure water, the progressing rate of the hydration reaction can be adequately reduced. Therefore, the clogging at the aluminum electrode surface due to an excessive hydrated film is less likely to occur. In addition, the generation rate of bubbles by the hydration reaction is slow and thus a state where the hydration reaction is difficult to be progressed in the deep part of the porous layer is less likely to occur. Therefore, a constitution may be achieved in which the thickness of the hydrated film satisfies the following conditions:

$$0.6 \leq t2/t1 \leq 1$$

where an average thickness of the hydrated film formed in a range from the surface of the aluminum electrode to a depth of 100 µm is t1 and an average thickness of the hydrated film formed in the deep part of the aluminum electrode (a part having a depth of 100 µm or more) is t2. Therefore, the clogging at the surface due to the excessive hydrated film can be reduced. Consequently, the break of the porous layer caused by not discharging the gas generated at the time of the subsequent chemical formation can be prevented and thus the leakage current of the electrode for the aluminum electrolytic capacitor can be reduced. In addition, in the present invention, there is an advantage that, different from the case where new treatment is added, significant change in production processes and production facilities is not necessary because the above conditions are achieved by changing conditions in the hydration step (the composition of the hydration treatment liquid or the like).

DESCRIPTION OF EMBODIMENTS

In the present invention, for producing the electrode for the aluminum electrolytic capacitor, the surface of the aluminum electrode is subjected to the chemical formation to produce the electrode for the aluminum electrolytic capacitor. In the following description, the case where the porous aluminum electrode formed by laminating the porous layer made by sintering the aluminum powder onto both surfaces of the aluminum core material is used as the aluminum electrode and such a porous aluminum electrode is subjected to the chemical formation will be mainly described. Hereinafter, after the structure of the aluminum electrode will be described, the chemical formation method will be described.

(Constitution of Aluminum Electrode)

Figure 1A:
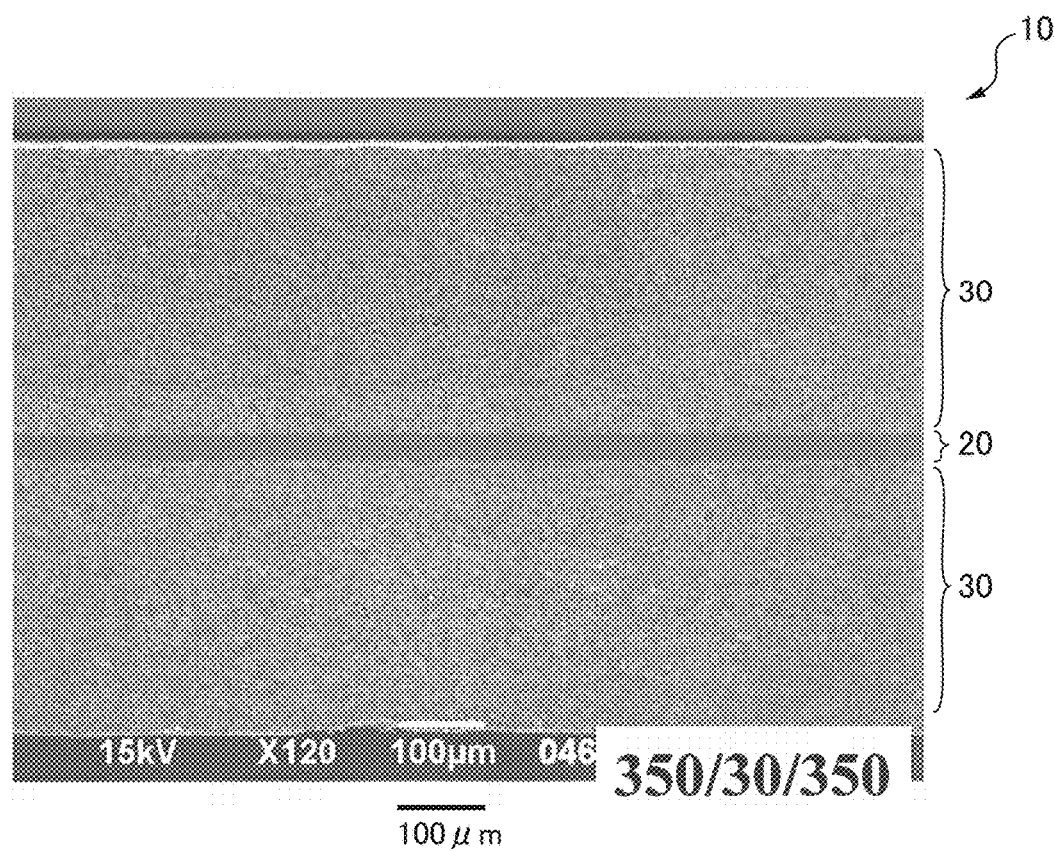
FIG. 1 includes explanatory views illustrating a sectional structure of an aluminum electrode to which the present invention is applied.
Figure 1B:
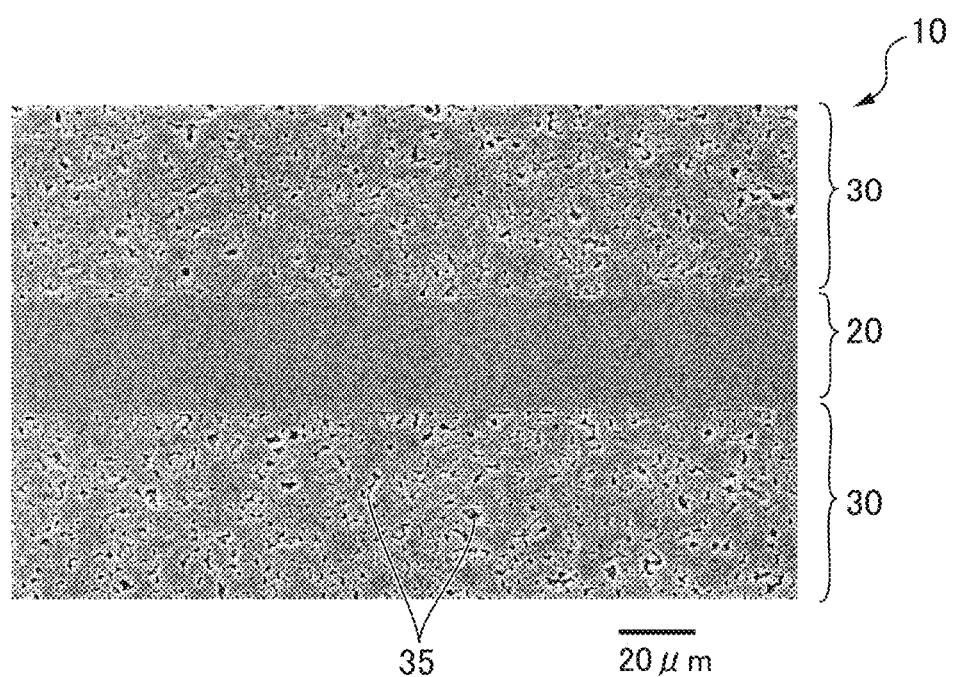
Figure 2:
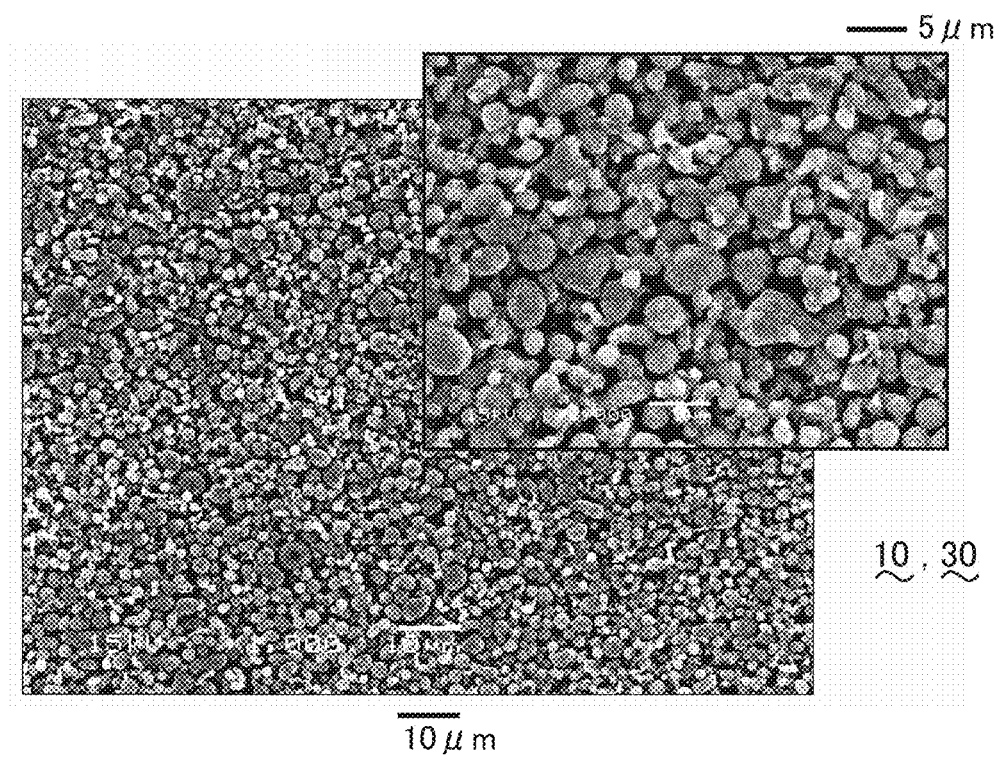
FIG. 2 includes photographs taken by magnifying the surface of the aluminum electrode to which the present invention is applied with an electron microscope.

FIG. 1 is an explanatory view illustrating a sectional structure of an aluminum electrode to which the present invention is applied. FIG. 1A and FIG. 1B are a photograph taken by magnifying the cross section of the aluminum electrode at 120 times with an electron microscope and a photograph taken by magnifying the vicinity of the core material of the aluminum electrode at 600 times with the electron microscope, respectively. FIG. 2 is a photograph taken by magnifying the surface of the aluminum electrode to which the present invention is applied with the electron microscope. Here, FIG. 2 include a photograph magnifying the surface of the porous aluminum electrode at 1000 times and a photograph magnifying the surface at 3000 times.

The aluminum electrode 10 illustrated in FIG. 1 and FIG. 2 has a core part and the porous layer 30 laminated on the surface of the core part and the porous layer 30 is a sintered layer made by sintering the aluminum powder or an etching layer. In this embodiment, the core part of the aluminum electrode 10 is an aluminum core material 20 and the porous layers 30 is a sintered layer made by sintering the aluminum powder. In this embodiment, the aluminum electrode 10 has the porous layers 30 on both surfaces of the aluminum core material 20.

The aluminum core material 20 has a thickness of 10 μm to 50 μm. In FIG. 1, the aluminum electrode 10 using the aluminum core material 20 having a thickness of about 30 μm is illustrated. The thickness of the porous layer 30 per layer (per one surface) is, for example, 200 μm to 50000 μm. FIG. 1 illustrates the aluminum electrode 10 in which the porous layer 30 having a thickness of about 350 μm is formed on both surfaces of the aluminum core material 20 having a thickness of 30 μm. As the thickness of the porous layer 30 becomes thicker, the electrostatic capacitance increases. Consequently, a thicker thickness is preferable. Therefore, the thickness of the porous layer 30 is preferably 300 μm or more per layer.

The aluminum core material 20 preferably has an iron content of less than 1000 ppm by mass and a silicon content of 500 ppm by mass to 5000 ppm by mass. The porous layer 30 is a layer made by sintering the aluminum powder having an iron content of less than 1000 ppm by mass and a silicon content of 50 ppm by mass to 3000 ppm by mass and the aluminum powder is sintered while the pores 35 are being retained with each other. In addition, when the aluminum core material 20 and the porous layer 30 include one or more of copper, manganese, magnesium, chromium, zinc, titanium, vanadium, gallium, nickel, boron, and zirconium, the content of each of these elements is 100 ppm by weight or less and the remnant is unavoidable metals and aluminum.

The shape of the aluminum powder is not particularly limited and any of a substantially spherical shape, an indeterminate shape, a scaly shape, a short fiber shape, and the like can be suitably used. In particular, in order to maintain the pores between the aluminum powders, the powder composed of substantially spherical particles is preferable. The average particle diameter of the aluminum powder in this embodiment is from 1 μm to 10 μm. Therefore, the surface area can be effectively expanded. Here, when the average particle diameter of the aluminum powder is less than 1 μm, the gap between the aluminum powders is excessively narrow and thus ineffective parts that do not function as the electrode or the like increase, whereas when the average particle diameter of the aluminum powder is more than 10 μm, the gap between the aluminum powder is excessively wide and thus enlargement the surface area is insufficient. In other words, when the average particle diameter of the aluminum powder is less than 1 μm, the pores 35 between the aluminum powders are buried to reduce the electrostatic capacitance when the chemical formation film having a film withstand voltage of 400 V or more is formed. On the other hand, when the average particle diameter is more than 10 μm, the pores 35 become excessively large and thus significant improvement in the electrostatic capacitance is not expected. Therefore, when the thick chemical formation film having a film withstand voltage of 400 V or more is formed on the aluminum electrode 10, the average particle diameter of the aluminum powder used for the porous layer 30 is 1 μm to 10 μm and preferably 2 μm to 10 μm. As the average particle diameter of the aluminum powder in this embodiment, particle size distribution in terms of volume basis is measured by a laser diffraction method. The average particle diameter of the powder after sintering is measured by observing the cross section of the sintered body with a scanning electron microscope. For example, although the powder after sintering is in a state where a part of the powder after sintering is melted or the powders are connected to each other, a part having a substantially circular shape can be regarded as approximately particle shape. A volume based particle size distribution is calculated from the number based particle size distribution to determine the average particle diameter. Here, the average particle diameter before the sintering and the average particle diameter after the sintering determined above are substantially the same.

In this embodiment, when the aluminum electrode 10 is used as the anode of an aluminum electrolytic capacitor, a chemical formation film is formed on the porous layer 30. At that time, when the part of the aluminum core material 20 exposed from the porous layer 30 exists, a chemical formation film is also formed on the aluminum core material 20.

(Method for Manufacturing Aluminum Electrode 10)

In the method for producing the porous aluminum electrode 10 to which the present invention is applied, first, in the first step, a film made of a composition including the aluminum powder having an iron content of preferably less than 1000 ppm by mass is formed on the surface of the aluminum core material 20. The aluminum powder is produced by an atomization method, a melt spinning method, a rotating disc method, a rotating electrode method, or other rapid cooling solidification methods. Among these methods, the atomization method, particularly a gas atomization method is preferable for industrial production. In the atomization method, a powder is obtained by atomizing the molten metal.

The composition may include a resin binder, a solvent, a sintering aid, a surfactant, and the like, if necessary. Known or commercially available additives may be used as these additives. In this embodiment, the composition is preferably used as a paste-like composition including at least one resin binder and solvent. This formulation allows the film to be efficiently formed. Suitably usable examples of the resin binder include a carboxy-modified polyolefin resin, a vinyl acetate resin, a vinyl chloride resin, a vinyl chloride-vinyl acetate copolymer resin, a vinyl alcohol resin, a butyral resin, a fluorinated vinyl resin, an acrylic resin, a polyester resin, a urethane resin, an epoxy resin, a urea resin, a phenol resin, an acrylonitrile resin, and a nitrocellulose resin. Depending on the molecular weight, the type of resin, and the like, these binders are separated into binders volatilized at the time of heating and binder residues of which remain together with the aluminum powder by thermal decomposition. Consequently, these binders can be used properly depending on the requirement of electric characteristics such as electrostatic capacitance. When the composition is prepared, a solvent is added. As such a solvent, water, ethanol, toluene, ketones, esters, and the like can be used singly or in combination.

The formation of the porous layer 30 can be appropriately selected from known methods depending on the properties of the composition and the like. For example, when the composition is powder (solid), the compacted powder of the powder may be formed (or thermocompression bonded) on the core material. In this case, the compacted powder can be solidified by sintering and the aluminum powder can be fixed onto the aluminum core material 20. When the composition is a liquid state (a paste state), the porous layer 30 can be formed by a coating method such as roller, brush, spray, dipping, and the like or can be formed by a known printing method. The film may be dried at a temperature within a range of 20° C. to 300° C., if necessary.

Subsequently, in the second step, the film is sintered at a temperature of 560° C. or more and 660° C. or less. The sintering time varies depending on the sintering temperature and the like. Usually, the sintering time can be appropriately determined within a range of about 5 hours to about 24 hours. The sintering atmosphere is not particularly limited and, for example, may be any of a vacuum atmosphere, an inert gas atmosphere, an oxidizing gas atmosphere (atmospheric air), a reducing atmosphere, and the like. In particular, the vacuum atmosphere or the reducing atmosphere is preferable. In addition, the pressure condition may be any of normal pressure, reduced pressure, or increased pressure. When the organic component such as resin binder is included in the composition (in the film), heat treatment (degreasing treatment) is preferably carried out prior to the first step and the second step in a temperature range of 100° C. or more and 600° C. or less for a holding time of 5 hours or more. The heat treatment atmosphere is not particularly limited and may be, for example, a vacuum atmosphere, an inert gas atmosphere, or an oxidizing gas atmosphere. In addition, the pressure condition may be any of normal pressure, reduced pressure, or increased pressure.

(Constitution of Aluminum Electrolytic Capacitor)

In order to produce the aluminum electrolytic capacitor using the aluminum electrode 10 after chemical formation (the electrode for the aluminum electrolytic capacitor) of this embodiment, for example, a capacitor element is formed by winding the anode foil made of the aluminum electrode 10 after chemical formation (the electrode for the aluminum electrolytic capacitor) and cathode foil with a separator interposed between the anode and the cathode. Subsequently, the capacitor element is impregnated with an electrolytic solution (a paste). Thereafter, the capacitor element including the electrolytic solution is placed in an outer case and the case is sealed with a sealing body.

When a solid electrolyte is used instead of the electrolytic solution, a solid electrolyte layer is formed on the surface of the anode foil made of the aluminum electrode 10 after chemical formation (the electrode for the aluminum electrolytic capacitor) and thereafter a cathode layer is formed on the surface of the solid electrolyte layer. Thereafter, the obtained product is exteriorized with a resin or the like. In this process, an anode terminal to be electrically connected to the anode and a cathode terminal to be electrically connected to the cathode layer are provided. In this case, a plurality of pieces of anode foil may be laminated.

As the aluminum electrode 10, a structure in which the porous layer 30 is laminated onto the surface of the rod-like aluminum core material 20 may be employed in some cases. In order to produce the aluminum electrolytic capacitor using such an aluminum electrode 10, for example, a solid electrolyte layer is formed on the surface of the anode made of the aluminum electrode 10 after chemical formation (the electrode for the aluminum electrolytic capacitor) and thereafter a cathode layer is formed on the surface of the solid electrolyte layer. Thereafter, the obtained product is exteriorized with a resin or the like. In this process, the anode terminal to be electrically connected to the anode and the cathode terminal to be electrically connected to the cathode layer are provided.

(Method for Producing Electrode for Aluminum Electrolytic Capacitor)

Figure 3:
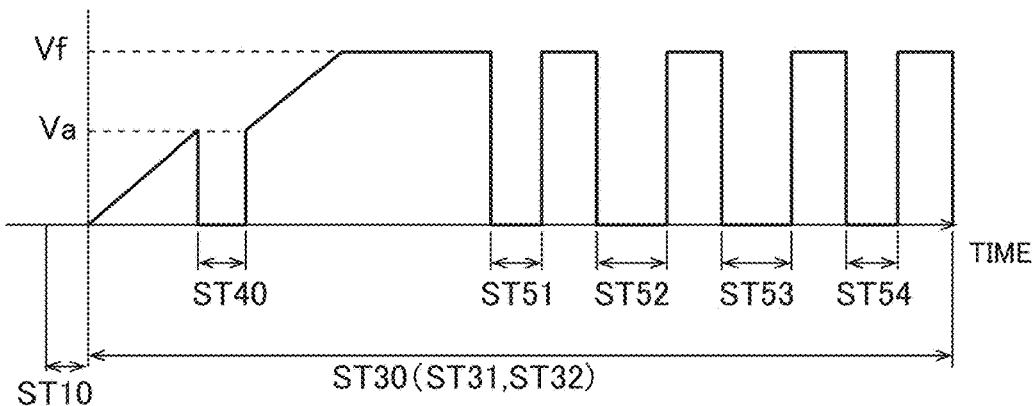
FIG. 3 includes explanatory views illustrating a method of producing the electrode for an aluminum electrolytic capacitor to which the present invention is applied.
Figure 3:
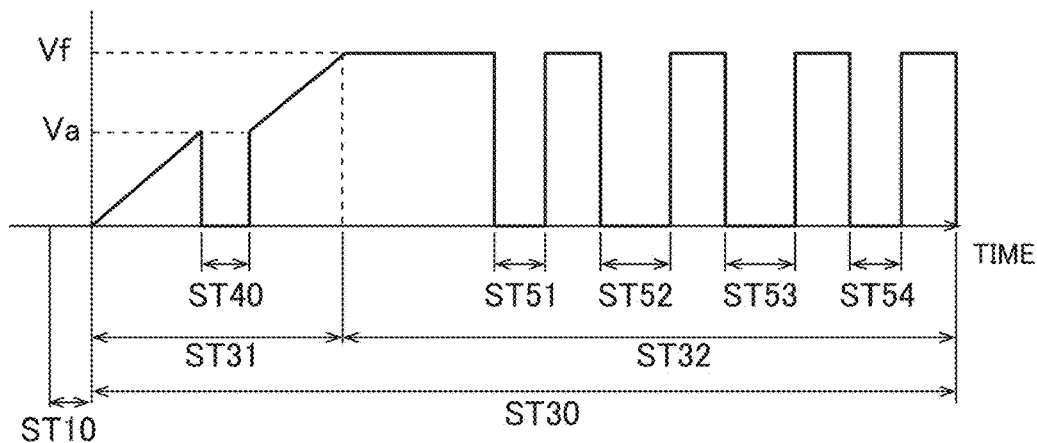
Figure 3:
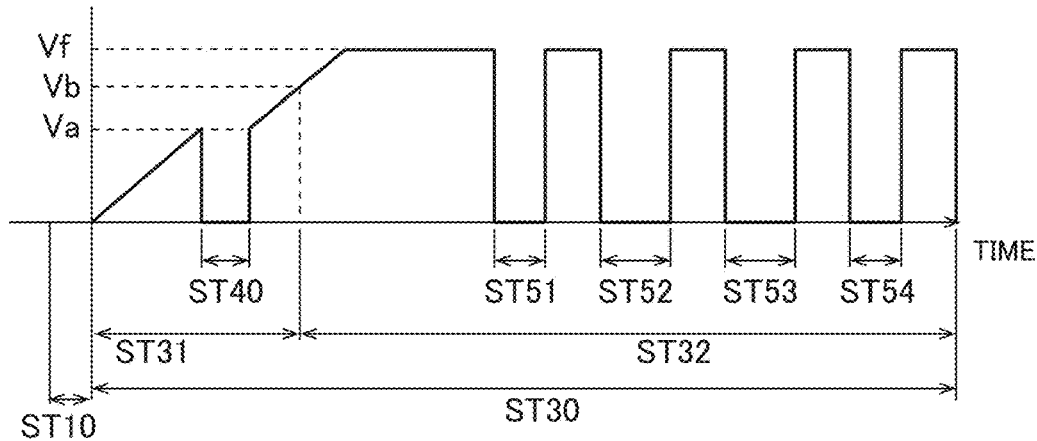
Figure 4:
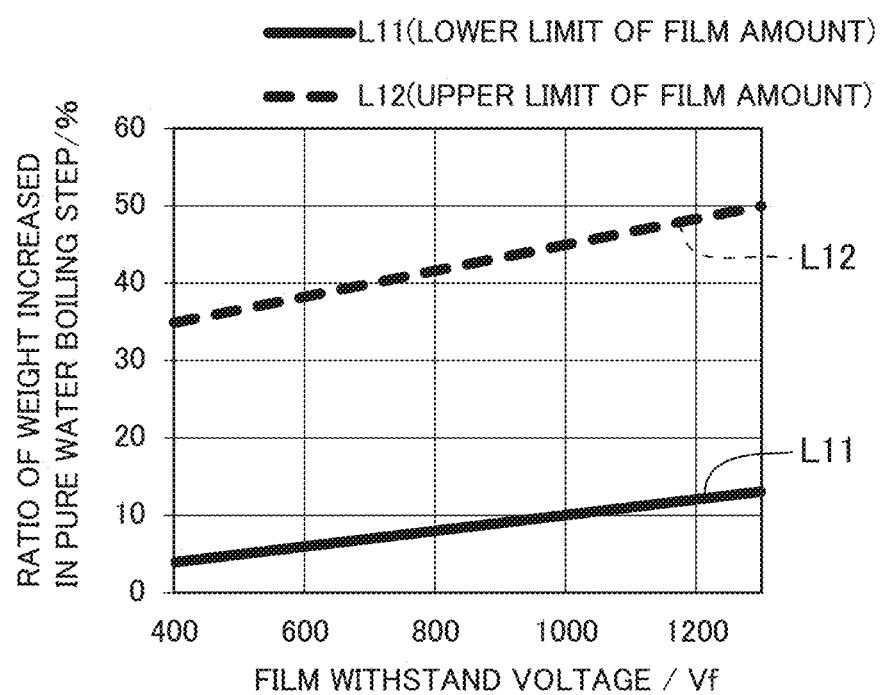
FIG. 4 is a graph illustrating an appropriate range of the hydrated aluminum film amount produced in the hydration step in the method for producing the electrode for an aluminum electrolytic capacitor to which the present invention is applied.

FIG. 3 is an explanatory view illustrating methods of producing the electrode for an aluminum electrolytic capacitor to which the present invention is applied. Each of the methods (1), (2), (3), and (4) illustrated in FIG. 3 is an explanatory view illustrating respective methods of the chemical formation step. FIG. 4 is a graph illustrating an appropriate range of the hydrated aluminum film amount produced in the hydration step ST10 in the method for producing the electrode for the aluminum electrolytic capacitor to which the present invention is applied.

First, as illustrated in the methods (1), (2), (3), and (4) in FIG. 3, in the method for producing the electrode for the aluminum electrolytic capacitor, the hydration step ST10 for boiling the aluminum electrode 10 in a hydration treatment liquid is carried out and thereafter the chemical formation step ST30 for subjecting the aluminum electrode 10 to the chemical formation until the film withstand voltage reaches 400 V or more is carried out, followed by carrying out a drying step.

In the hydration step ST10, the aluminum electrode 10 is boiled in the hydration treatment liquid having a liquid temperature of 80° C. or more (80° C. to 100° C.) for 1 minute to 30 minutes to form a hydrated aluminum film such as boehmite on the aluminum electrode 10.

In the hydration step ST10, when an average thickness of the hydrated film formed in a range from the surface of the aluminum electrode to a depth of 100 μm is t1 and an average thickness of the hydrated film formed in the deep part of the aluminum electrode (a part having a depth of 100 μm or more) is t2, the average thickness t1 of the hydrated film formed in a range from the surface of the aluminum electrode to a depth of 100 μm and the average thickness t2 of the hydrated film formed in the deep part (the part having a depth of 100 μm or more) satisfy the following conditions:

$$0.6 \leq t2/t1 \leq 1.$$

In this embodiment, an aqueous solution including the hydration inhibiting agent and having a pH of 5.0 to 9.0 is used as the hydration treatment liquid. Here, the inorganic hydration inhibiting agents including boric acid or the salts thereof and the inorganic hydration inhibiting agents may be used as the hydration inhibiting agent. The organic hydration inhibiting agent has higher hydration inhibition effect than that of the organic hydration inhibiting agent. Therefore, in this embodiment, an aqueous solution including the organic hydration inhibiting agent having a carbon number of 3 or more and having a pH of 5.0 to 9.0 is used as the hydration treatment liquid. Such an organic hydration inhibiting agent inhibits strong reaction of aluminum with water by adsorbing the hydration inhibiting agent onto the aluminum surface. As the hydration inhibiting agent, one or more of the sugar having a carbon number of 3 or more or the sugar alcohol having a carbon number of 3 or more may be used. Examples of such hydration inhibiting agent include ribulose, xylulose, ribose, arabinose, xylose, lyxose, deoxyribose, psicose, fructose, sorbose, tagatose, allose, altrose, glucose, mannose, gulose, idose, galactose, talose, fucose, fuculose, rhamnose, sedoheptulose, mannitol, sorbitol, xylitol, sucrose, lactulose, lactose, maltose, trehalose, cellobiose, lactitol, maltitol, nigerose, raffinose, maltotriose, melezitose, stachyose, acarbose, and amylose In addition, as the hydration inhibiting agent, one or more of the organic acid having a carbon number of 3 or more or a salt thereof may be used. Examples of the organic acid in this case include dodecanoic acid, benzoic acid, propanedioic acid, butanedioic acid, (E)-2-butenedioic acid, pentanedioic acid, hexanedioic acid, decanedioic acid, dodecanedioic acid, 2-hydroxypropane-1,2,3-tricarboxylic acid, and (E)-1-propene-1,2,3-tricarboxylic acid.

The amount of the hydrated aluminum film produced in the hydration step ST10 is preferably in a range from the lower limit of x indicated by the solid line L11 in FIG. 4 to the upper limit of x indicated by the broken line L12 in FIG. 4, when the ratio x of the mass increased by the hydration step ST10 is represented by the following formula (Mathematical formula 1).

[Mathematical formula 1]

$$x = \frac{\text{Mass (g) increased by hydration step } ST10}{\text{Mass (g) of aluminum electrode 10 before hydration step } ST10} \times 100 (\% \text{ by mass})$$

Mass (g) increased by hydration step $ST10$ =
 Mass (g) of aluminum electrode 10 after hydration step $ST10$ −
  Mass (g) of aluminum electrode 10 before hydration step $ST10$ More specifically, when the final film withstand voltage of the chemical formation film is represented by Vf (V) and the ratio of the mass increased by the hydration step ST10 is represented by x, the solid line L11 indicating the lower limit of x is represented by the following formula.

$$x = (0.01 \times Vf)$$

The broken line L12 indicating the upper limit of x is represented by the following formula.

$$x = (0.017 \times Vf + 28)$$

Therefore, in this embodiment, the conditions of the hydration step ST10 are preferably set so that the film withstand voltage Vf (V) and the ratio x (% by mass) satisfy the following conditional formula.

$$(0.01 \times Vf) \leq x \leq (0.017 \times Vf + 28)$$

When the amount of hydrated aluminum film is appropriate, a sufficiently thick chemical formation film can be formed with a small amount of electricity in the chemical formation step ST30. In contrast, when x is less than the lower limit of the above conditional formula, excessive heat generation occurs in the chemical formation step ST30 and thus a robust chemical formation film is not formed. When x is more than the upper limit of the above conditional formula, the hydrated aluminum film becomes excessive and thus and the organic acid aqueous solution used for the chemical formation liquid is easily trapped in in the pores 35 of the porous layer 30.

In this embodiment, in the chemical formation step ST30, the phosphoric acid immersion step ST40 for immersing the aluminum electrode 10 into an aqueous solution containing phosphate ions is carried out one or more times in the course of voltage rise of the power supply voltage to the chemical formation voltage. In such a phosphoric acid immersion step ST40, the aluminum electrode 10 is immersed in a phosphoric acid aqueous solution having a liquid temperature of 40° C. to 80° C. and a specific resistance measured at 60° C. of 0.1 Ωm to 5 Ωm for a period of 3 minutes to 30 minutes. The phosphoric acid immersion step ST40 is carried out one or more times. The methods of (1), (2), (3), and (4) in FIG. 3 illustrate the case where the phosphoric acid immersion step ST40 is carried out once when the film withstand voltage reaches the voltage Va lower than the final chemical formation voltage Vf.

According to such a phosphoric acid immersion step ST40, the precipitated aluminum hydroxide in the chemical formation step ST30 can be efficiently removed and the subsequent generation of aluminum hydroxide can be reduced. Therefore, the residual chemical formation liquid inside the pores of the porous layer can be reduced. In addition, phosphate ions can be taken into the chemical formation film by the phosphoric acid immersion step and thus the stability of the chemical formation film such as being possible to improve durability to immersion in boiling water or acidic solution can be effectively improved.

(Specific Example of Chemical Formation Step ST30)

Among the methods (1), (2), (3) and (4) illustrated in FIG. 3, a first chemical formation treatment ST31 is carried out using an aqueous solution of an organic acid such as adipic acid or a salt thereof is used as the chemical formation liquid in the method (1) illustrated in FIG. 3. For example, the aluminum electrode 10 is subjected to the chemical formation in an aqueous solution (an organic acid-based chemical formation liquid) containing an organic acid such as adipic acid or a salt thereof and having a specific resistance of 5 Ωm to 500 Ωm measured at 50° C. under a condition of a liquid temperature of 30° C. to 80° C. In this process, the power supply voltage applied between the aluminum electrode 10 and the counter electrode is raised until the power supply voltage reaches the final chemical formation voltage Vf and thereafter the power supply voltage is retained at the chemical formation voltage Vf. In this embodiment, the liquid temperature is set 80° C. or lower in such a first chemical formation treatment ST31 and thus elution of aluminum at the time of chemical forming can be reduced. Therefore, a state where the aqueous solution containing the organic acid or the salt thereof is trapped in the pores 35 of the porous layer 30 by precipitating the aluminum ions as aluminum hydroxide is difficult to occur. In addition, the liquid temperature is set 30° C. or more and thus a high electrostatic capacitance can be obtained. In the first chemical formation treatment ST31, when the specific resistance of the chemical formation liquid is more than 500 Ωm, the effect of improving the electrostatic capacitance is difficult to obtain and when the specific resistance of the chemical formation liquid is less than 5 Ωm, the organic acid or the salt thereof trapped in the pores 35 of the porous layer 30 easily burns and explodes.

Here, when the first chemical formation treatment ST31 for performing chemical formation of the aluminum electrode 10 having a thick and complicated shape of the porous layer 30 in an aqueous solution containing the organic acid or the salt thereof is carried out, the break of the pores 35 due to the thickness of the porous layer 30 easily occurs. In particular, when the chemical formation is carried out using the porous layer 30 having a thickness of 250 μm or more per layer at a voltage of 400 V or more, clogging tends to occur due to the precipitation of aluminum hydroxide even when the chemical formation liquid conditions and depolarization conditions are optimized. In this embodiment, however, the phosphoric acid immersion step ST40 is carried out and thus the precipitated aluminum hydroxide can be effectively removed before clogging occurs and the formation of aluminum hydroxide thereafter can be reduced. Therefore, the residual aqueous solution containing the organic acid or the salt thereof in the pores 35 of the porous layer 30 can be reduced. In addition, phosphate ions can be taken into the chemical formation film by the phosphoric acid immersion step ST40. Therefore, the durability to the immersion in boiling water or an acidic solution can be improved and thus the stability of the chemical formation film can be improved.

In the chemical formation step ST30, after the voltage reaches the chemical formation voltage Vf, depolarization treatment such as the thermal depolarization treatment for heating the aluminum electrode 10 and in-liquid depolarization treatment for immersing the aluminum electrode 10 in an aqueous solution containing phosphate ions is carried out. Each of the methods (1), (2), (3), and (4) illustrated in FIG. 3 illustrates the case where four depolarization treatment ST51, ST52, ST53, and ST54 are carried out. The depolarization treatment is carried out by combining the thermal depolarization treatment and the in-liquid depolarization treatment. In any combinations, the final depolarization treatment is preferably the thermal depolarization treatment. In addition, the aluminum electrode 10 is preferably subjected to water washing treatment for 5 minutes or more before the thermal depolarization treatment that is carried out first from among the thermal depolarization treatments.

In the thermal depolarization treatment, for example, the treatment temperature is from 450° C. to 550° C. and the treatment time is from 2 minutes to 10 minutes. In the in-liquid depolarization treatment, the aluminum electrode 10 is preferably immersed in an aqueous solution of 20% by mass to 30% by mass phosphoric acid at a liquid temperature of 60° C. to 70° C. for 5 minutes to 15 minutes depending on the film withstand voltage. In the in-liquid depolarization treatment, no voltage is applied to the aluminum electrode 10.

Among the methods (1), (2), (3) and (4) illustrated in FIG. 3, a second chemical formation treatment ST32 is carried out using an aqueous solution of an inorganic acid such as boric acid and phosphoric acid as the chemical formation liquid in the method (2) illustrated in FIG. 3, instead of the first chemical formation treatment ST31 using the aqueous solution of the organic acid such as adipic acid or the salt thereof is used as the chemical formation liquid. For example, in the aqueous solution (inorganic acid-based chemical formation liquid) containing an inorganic acid such as boric acid or phosphoric acid or a salt thereof and having a specific resistance measured at 90° C. of 10 Ωm to 1000 Ωm, the aluminum electrode 10 is subjected to the chemical formation under conditions of a liquid temperature of 50° C. to 95° C. In the second chemical formation treatment ST32, the elution of aluminum at the time of chemical formation can be reduced by setting the liquid temperature of the chemical formation liquid to 95° C. or less. For this reason, a state that the precipitation of aluminum ions as aluminum hydroxide fills the pores 35 of the porous layer 30 and thus the electrostatic capacitance is lowered can be prevented. By setting the liquid temperature of the chemical formation liquid to 50° C. or more, a high film withstand voltage can be obtained. Here, when the specific resistance of the chemical formation liquid is more than 1000 Ωm, a robust film is not formed and the leakage current becomes extremely high. In contrast, when the specific resistance of the chemical formation liquid is less than 10 Ωm, spark discharge occurs during the chemical formation and thus the formed chemical formation film is broken.

In addition, as in the method (3) illustrated in FIG. 3, the first chemical formation treatment ST31 using the aqueous solution of the organic acid such as adipic acid or the salt thereof as the chemical formation liquid may be carried out until the voltage reaches the chemical formation voltage Vf and after the voltage reaches the chemical formation voltage Vf, the second chemical formation treatment ST32 using the aqueous solution containing the inorganic acid such as boric acid or phosphoric acid or the salt thereof as the chemical formation liquid may be carried out.

In addition, as in the method (4) illustrated in FIG. 3, after the phosphoric acid immersion step ST40, the first chemical formation treatment ST31 using the aqueous solution of the organic acid such as adipic acid or the salt thereof is used as the chemical formation liquid may be carried out until the voltage reaches the voltage Vb before reaching the chemical formation voltage Vf, and thereafter the second chemical formation treatment ST32 using the aqueous solution containing the inorganic acid such as boric acid and phosphoric acid or the salt thereof as the chemical formation liquid may be carried out until the voltage reaches the chemical formation voltage Vf and after the voltage reaches the formation voltage Vf.

Main Effect of this Embodiment

In this embodiment, in the hydration step ST10, the average thickness t1 of the hydrated film formed in a range from the surface of the aluminum electrode to a depth of 100 μm and the average thickness t2 of the hydrated film formed in the deep part of the aluminum electrode (a part having a depth of 100 µm or more) satisfy the following conditions:

$$0.6 \leq t2/t1 \leq 1.$$

Therefore, the clogging at the surface due to the excessive hydrated film can be reduced. Consequently, the break of the porous layer caused by not discharging the gas generated at the time of the subsequent chemical formation can be prevented and thus the leakage current of the electrode for the aluminum electrolytic capacitor can be reduced. Here, the hydrated film is difficult to grow in the deeper side and thus t2/t1 is 1 or less. When t2/t1 is less than 0.6, the clogging at the surface tends to be generated due to the excessive hydrated film. In this embodiment, however, t2/t1 is 0.6 or more and thus the clogging at the surface is less likely to occur.

Figure 5A:
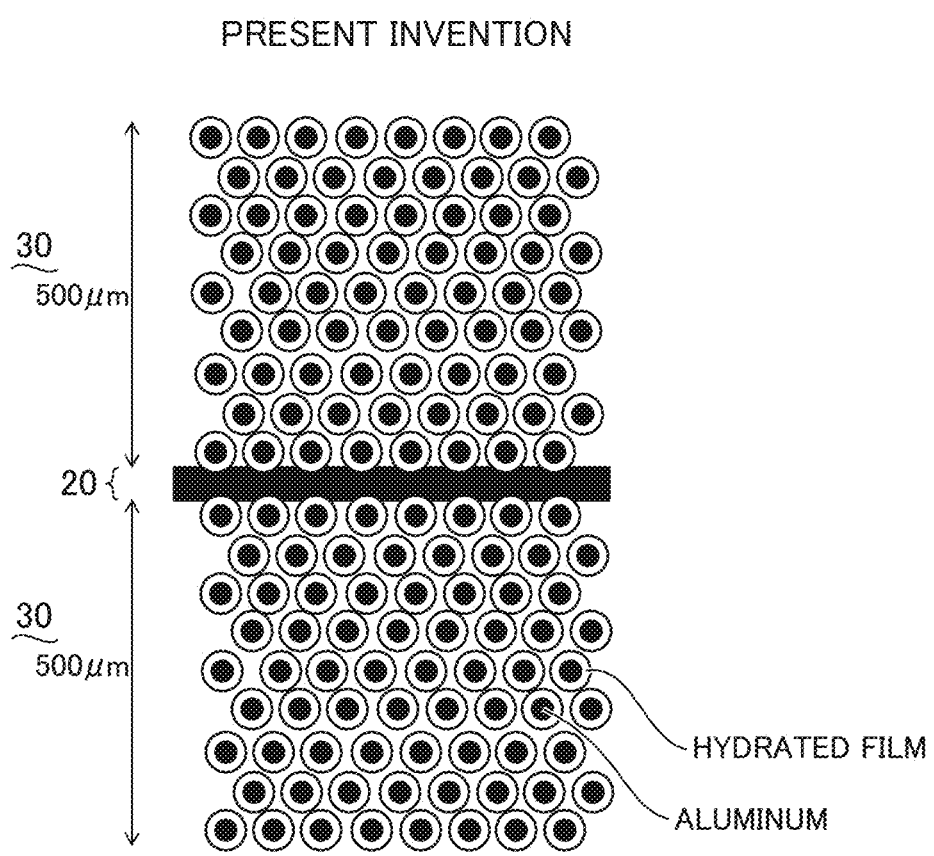
FIG. 5 includes explanatory views illustrating an effect when the hydration step according to the present invention is applied to the porous aluminum electrode.
Figure 6A:
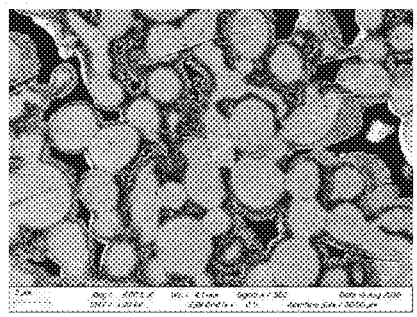
FIG. 6 includes photographs taken by magnifying the cross section when the hydration step according to the present invention is applied to the porous aluminum electrode with an electron microscope.
Figure 6B:
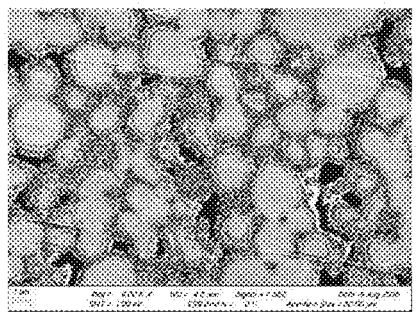
Figure 6C:
Figure 6D:
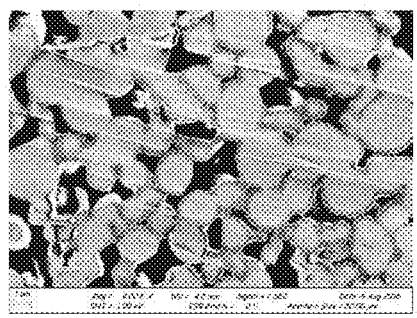

FIG. 5 is an explanatory views illustrating an effect when the hydration step ST10 according to the present invention is applied to the porous aluminum electrode. In FIG. 5 illustrates a state FIG. 5A where the present invention is applied and a state FIG. 5B where pure water boiling is carried out in the hydration step as a reference example of the present invention.

FIG. 6 are photographs taken by magnifying the cross section of the porous aluminum electrode to which the hydration step ST10 according to the present invention is applied with an electron microscope. The state FIG. 6A at a depth of 50 µm from the surface when the present invention is applied, the state FIG. 6B at a depth of 50 from the surface when pure water boiling is carried out in the hydration step as a reference example of the present invention, the state FIG. 6C at a depth of 300 µm from the surface when the present invention is applied, and the state FIG. 6D at a depth of 300 µm from the surface when pure water boiling is carried out in the hydration step as a reference example of the present invention are illustrated.

In this embodiment, in the hydration step ST10 before the chemical formation step ST30, when the aluminum electrode 10 is immersed into the hydration treatment liquid having a temperature of 80° C. or more to form the hydrated film on the aluminum electrode 10, a hydration treatment liquid including the hydration inhibiting agent having a carbon number of 3 or more and having a pH of 5.0 to 9.0 is used as the hydration treatment liquid. Consequently, different from the pure water boiling in which the aluminum electrode 10 is immersed into boiling pure water, the progressing rate of the hydration reaction can be adequately reduced. Therefore, the clogging at the aluminum electrode surface due to an excessive hydrated film is less likely to occur. In addition, the generation rate of bubbles by the hydration reaction is slow. Consequently, a state where the hydration reaction is difficult to progress in the deep part of the porous layer is less likely to occur. Thus, the average thickness t1 of the hydrated film formed in a range from the surface of the aluminum electrode to a depth of 100 µm and the average thickness t2 of the hydrated film formed in the deep part of the aluminum electrode (a part having a depth of 100 µm or more) satisfy the following conditions:

$$0.6 \leq t2/t1 \leq 1$$

and thus the break of the porous layer caused by not discharging the gas generated at the time of the subsequent chemical formation can be prevented. Consequently, the leakage current of the electrode for the aluminum electrolytic capacitor can be reduced. In addition, the hydration resistance of the electrode for the aluminum electrolytic capacitor can also be improved.

In addition, in this embodiment, the aluminum electrode 10 is the porous aluminum electrode in which the porous layer 30 made of the sintered layer of aluminum powder is laminated in a thickness of 200 µm to 50000 µm per layer onto the aluminum core material 20. Therefore, even when the chemical formation voltage is 400 V or more, the aluminum electrode can obtain high electrostatic capacitance compared with the case where an etched foil is used as the aluminum electrode 10. In addition, the surface of the porous layer 30 has higher reactivity with boiling pure water than that of the surface of the etched foil and thus defects are likely to be formed in the hydrated film. In this embodiment, however, in the hydration step ST10, an aqueous solution including the organic hydration inhibiting agent having a carbon number of 3 or more and having a pH of 5.0 to 9.0 is used as the hydration treatment liquid instead of boiling pure water and thus the progressing rate of the hydration reaction can be adequately reduced. Therefore, the clogging at the aluminum electrode surface due to an excessive hydrated film is less likely to occur. In addition, the generation rate of bubbles by the hydration reaction is low. Consequently, a state where the hydration reaction is difficult to progress in the deep part of the porous layer is less likely to occur. Thus, the thickness of the hydrated film satisfies the following conditions:

$$0.6 \leq t2/t1 \leq 1.$$

Therefore, the break of the porous layer caused by not discharging the gas generated at the time of the subsequent chemical formation can be prevented. Consequently, the leakage current of the electrode for the aluminum electrolytic capacitor can be reduced. In addition, the hydration resistance of the electrode for the aluminum electrolytic capacitor can also be improved.

In addition, when pure water boiling is carried out in the hydration step ST10 in the case where the thickness of the porous layer 30 is 200 µm or more (for example, 250 µm) per layer, bubbles are intensely generated. Therefore, as Reference Example FIG. 5B illustrated in FIG. 5, the hydration reaction is difficult to progress in the deep part of the porous layer 30 and thus the hydrated film may be improperly formed. When the present invention is applied, however, the progressing rate of the hydration reaction can be adequately reduced and thus, the generation rate of bubbles due to the hydration reaction is low, and as illustrated in FIG. 5A, a state where the hydration reaction in the deep part of the porous layer is difficult to progress due to the generated bubbles is less likely to occur. Therefore, even when the thickness of the porous layer 30 per layer is 200 µm or more, the thickness of the hydrated film falls within the range of:

$$0.6 \leq t2/t1 \leq 1$$

and thus the break of the porous layer caused by not discharging the gas generated at the time of the subsequent chemical formation can be prevented. Consequently, the leakage current of the electrode for the aluminum electrolytic capacitor can be reduced. In addition, the hydration resistance of the electrode for the aluminum electrolytic capacitor can also be improved.

In addition, in this embodiment, there is an advantage that, different from the case where new treatment is added, significant change in production processes and production facilities is not necessary because only the conditions (the composition of the hydration treatment liquid or the like) of the hydration step ST10 ARE changed.

In addition, for reducing the reaction in the hydration step ST10, a method for adding a phosphate acid or a silicate may be considered. Such an inorganic hydration inhibiting agent, however, extremely lowers the rate of the hydration reaction and thus the hydrated film is difficult to be formed in an appropriate reaction rate and an adequate thickness in a wide condition range. According to the hydration inhibiting agent used in this embodiment, the rate of the hydration reaction is appropriately lowered in a wide condition range. Therefore, the hydration inhibiting agent used in this embodiment is preferable for forming the hydrated film in an appropriate thickness.

In addition, in the chemical formation step ST30, when the organic acid chemical formation is carried out in the first chemical formation treatment ST31, the electrostatic capacitance of the electrode for the aluminum electrolytic capacitor can be improved. Even in this case, the leakage current of the electrode for the aluminum electrolytic capacitor can also be reduced when the inorganic acid chemical formation is carried out in the second chemical formation treatment ST32.

Example

Subsequently, Examples of the present invention will be described. First, various kinds of aluminum electrodes 10 listed in Table 1, chemical formation liquids listed in Table 2, and a phosphoric acid aqueous solution (a treatment liquid of the phosphoric acid immersion step ST40) having a liquid temperature of 50° C. and a specific resistance of 0.2 Ωm measured at 50° C. were prepared. Subsequently, the hydration step ST10 was carried out by immersing the aluminum electrode 10 into the hydration treatment liquid in which the hydration inhibiting agent listed in Table 3 was dissolved in pure water to form the hydrated film in which the above ratio x was 25%.

Subsequently, in the chemical formation step ST30, in the method (4) illustrated in FIG. 3, the chemical formation was carried out in such a manner that the voltage was raised so that the film withstand voltage reached 600 V in the first chemical formation treatment ST31, and thereafter the treated hydrated film was washed with water, followed by carrying out the second chemical formation treatment ST32 until the chemical formation voltage reached 800 V. Here, in the course of the first chemical formation treatment ST31, the number of times listed in Table 3 of the phosphoric acid immersion step ST40 was carried out. In the second chemical formation treatment ST32, the number of times listed in Table 3 of thermal depolarization and in-liquid depolarization was carried out.

With respect to the electrode for an aluminum electrolytic capacitor prepared by such a method, presence/absence of break of the porous layer 30, film withstand voltage, electrostatic capacitance per unit volume, leakage current per unit volume, and hydration resistance were measured. The results are listed in Table 4. Here, the film withstand voltage, electrostatic capacitance per unit volume, and the leakage current per unit volume were measured in accordance with JEITA (Japan Electronics and Information Technology Industries Association) standard. The hydration resistance was measured in accordance with JEITA standard and the measurement was carried out at a current density of 30 mA/cm$^3$.

TABLE 1

| Electrode sample No. | Shape of core material 20 | Average particle diameter of aluminum powder (μm) | Total of thickness of porous layer 30 per layer (μm) |
|---|---|---|---|
| 1 | Foil (thickness 30 μm) | 5 | 300 (per one surface) |
| 2 | Foil (thickness 30 μm) | 5 | 500 (per one surface) |
| 3 | Rod-like shape (1 φ) | 5 | 1000 (in diameter direction) |

TABLE 2

| | Composition of chemical formation liquid | Liquid temperature (° C.) |
|---|---|---|
| First chemical formation treatment ST31 | Aqueous solution of ammonium adipate having a specific resistance of 50 Ωm measured at 50° C. | 60 |
| Second chemical formation treatment ST32 | Aqueous solution of boric acid having a specific resistance of 100 Ωm measured at 90° C. | 90 |

TABLE 3

| Electrode sample No. | Organic hydration inhibiting agent | pH of hydration treatment liquid | Number of times of phosphoric acid immersion step ST40 in first chemical formation treatment ST31 | Number of times of thermal depolarization in second chemical formation treatment ST32 | Number of times of in-liquid depolarization in second chemical formation treatment ST32 | |
|---|---|---|---|---|---|---|
| 1 | Sucrose 30 g/L | 6 | 3 | 2 | 1 | Example 1 |
| 1 | Fructose 5 g/L | 6 | 3 | 2 | 1 | Example 2 |
| 2 | Sorbitol 2 g/L | 6 | 4 | 3 | 2 | Example 3 |
| 3 | Lactose 5 g/L | 6 | 5 | 4 | 3 | Example 4 |
| 3 | Raffinose 20 g/L | 6 | 5 | 4 | 3 | Example 5 |
| 1 | Hexanedioic acid 3 g/L + aqueous ammonia | 6 | 3 | 3 | 3 | Example 6 |
| 1 | (E)-2-butenedioic acid 1 g/L + aqueous ammonia | 7.5 | 3 | 3 | 3 | Example 7 |
| 1 | None | 6.5 | 0 | 2 | 2 | Comparative Example 1 |
| 1 | Hexanedioic acid 3 g/L + aqueous ammonia | 4.5 | 3 | 3 | 3 | Comparative Example 2 |

TABLE 4

| Remarks | Presence/absence of break of porous layer 30 | Film withstand voltage (V) | Electrostatic capacitance (μF/cm³) | Leakage current (μA/cm³) | Hydration resistance (s) |
|---|---|---|---|---|---|
| Example 1 | Absence | 821 | 39 | 11 | 13 |
| Example 2 | Absence | 834 | 37 | 13 | 14 |
| Example 3 | Absence | 832 | 38 | 10 | 12 |
| Example 4 | Absence | 829 | 39 | 12 | 15 |
| Example 5 | Absence | 841 | 38 | 11 | 16 |
| Example 6 | Absence | 836 | 36 | 6 | 11 |
| Example 7 | Absence | 823 | 37 | 4 | 10 |
| Comparative Example 1 | Presence | 350 | 27 | 140 | 1400 |
| Comparative Example 2 | Presence | 360 | 26 | 126 | 1300 |

As can be seen from Table 4, in Examples 1 to 7 in the present invention, the chemical formation can be achieved without defective appearance. In addition, the leakage current is low and the hydration resistance is excellent.

In contrast, in Comparative Example 1, boiling was carried out with pure water to which no hydration inhibiting agent was added. Consequently, many defects are generated in the hydrated film and thus the leakage current is high. In addition, in Comparative Example 1, a sufficient hydrated film is not formed at the center part in the thickness direction of the aluminum electrode 10 and thus heat generation during the chemical formation is large. This causes break of the porous layer 30 and thus the film withstand voltage and the hydration resistance are low. In addition, in Comparative Example 2, (E)-2-butenedioic acid is added as the hydration inhibiting agent. However, in Comparative Example 2, pH is 4.5 and this value deviates from the appropriate pH range of 5.0 to 9.0. Therefore, the effect is not obtained and the hydrated film is not formed due to progress of dissolution of the porous layer. Consequently, heat generation during the chemical formation is large and this heat generation causes the break of the porous layer, resulting in high leakage current and low hydration resistance.

Other Embodiments

In Examples described above, in the chemical formation step ST30, as in the method (4) illustrated in FIG. 3, the first chemical formation treatment ST31 was carried out until the voltage reached the voltage Vb before reaching the chemical formation voltage Vf after the phosphoric acid immersion step ST40 and thereafter the second chemical formation treatment ST32 is carried out. However, as in the method (3) illustrated in FIG. 3, the present invention may be applied to the case where the first chemical formation treatment ST31 is carried out until the voltage reached the chemical formation voltage Vf and thereafter the second chemical formation treatment ST32 is carried out. In addition, as in the method (1) illustrated in FIG. 3, the present invention may be applied when all of the chemical formation step ST30 is carried out as the first chemical formation treatment ST31. In addition, as in the method (2) illustrated in FIG. 3, the present invention may be applied when all of the chemical formation step ST30 is carried out as the second chemical formation treatment ST32.

In the above embodiment, the case where the porous aluminum electrode formed by laminating the porous layer made of the sintered layer of aluminum powder onto the aluminum core material is used is exemplified. However, the present invention may be applicable in the case where an etched foil is used and the aluminum electrode.

The invention claimed is:

1. A method for producing an electrode for an aluminum electrolytic capacitor, the method comprising:
    a hydration step of forming a hydrated film onto an aluminum electrode including a porous layer having a thickness of 200 μm to 50000 μm per layer on an aluminum core part by immersing the aluminum electrode into a hydration treatment liquid including a hydration inhibiting agent and having a temperature of 80° C. or more; and
    a chemical formation step of performing chemical formation of the aluminum electrode to a chemical formation voltage of 400 V or more after the hydration step, wherein
    the thickness of the hydrated film formed in the hydration step satisfies the following conditions:

$0.6 \leq t2/t1 \leq 1$ where an average thickness of the hydrated film formed in a range from the surface of the aluminum electrode to a depth of 100 μm is t1 and an average thickness of the hydrated film formed in a deep part having a depth of 100 μm or more from the surface of the aluminum electrode is t2,
    wherein the hydration inhibiting agent is a sugar having a carbon number of 3 or more or a sugar alcohol having a carbon number of 3 or more.

2. The method for producing the electrode for the aluminum electrolytic capacitor according to claim 1, wherein the hydration treatment liquid has a pH of 5.0 to 9.0.

3. The method for producing the electrode for the aluminum electrolytic capacitor according to claim 1, wherein the hydration inhibiting agent is any one of ribulose, xylulose, ribose, arabinose, xylose, lyxose, deoxyribose, psicose, fructose, sorbose, tagatose, allose, altrose, glucose, mannose, gulose, idose, galactose, talose, fucose, fuculose, rhamnose, sedoheptulose, mannitol, sorbitol, xylitol, sucrose, lactulose, lactose, maltose, trehalose, cellobiose, lactitol, maltitol, nigerose, raffinose, maltotriose, melezitose, stachyose, acarbose, and amylose.

4. The method for producing an electrode for an aluminum electrolytic capacitor according to claim 1, wherein the porous layer is made of sintered layers of aluminum powder, and the aluminum electrode is formed by laminating the porous layer onto aluminum core material as the core part.

5. The method for producing an electrode for an aluminum electrolytic capacitor according to claim 1, wherein the chemical formation step includes first chemical formation treatment for subjecting the aluminum electrode to chemical formation in an aqueous solution including an organic acid or a salt thereof and second chemical formation treatment for subjecting the aluminum electrode to chemical formation in an aqueous solution including an inorganic acid or a salt thereof after the first chemical formation treatment.

\* \* \* \* \*